US012720637B2

(12) United States Patent
Hong

(10) Patent No.: US 12,720,637 B2
(45) Date of Patent: Aug. 25, 2026

(54) COMMUNICATION STATUS CHANGING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 284 days.

(21) Appl. No.: 18/570,056

(22) PCT Filed: Jun. 16, 2021

(86) PCT No.: PCT/CN2021/100372
§ 371 (c)(1),
(2) Date: Dec. 13, 2023

(87) PCT Pub. No.: WO2022/261861
PCT Pub. Date: Dec. 22, 2022

(65) Prior Publication Data
US 2024/0284547 A1 Aug. 22, 2024

(51) Int. Cl.
*H04W 76/27* (2018.01)
*H04W 88/06* (2009.01)

(52) U.S. Cl.
CPC ............ *H04W 76/27* (2018.02); *H04W 88/06* (2013.01)

(58) Field of Classification Search
CPC ..... H04W 88/06; H04W 76/27; H04W 48/18; H04W 76/15; H04W 68/02; H04W 76/28; H04W 12/45; H04W 60/04; H04W 72/53; H04W 72/535; H04W 76/10; H04W 52/0274; H04W 72/0446; H04W 24/10;
(Continued)

(56) References Cited

U.S. PATENT DOCUMENTS 9,198,183 B2 * 11/2015 Anand .................. H04W 76/28
2018/0160422 A1 * 6/2018 Pathak .................. H04W 76/10
(Continued)

FOREIGN PATENT DOCUMENTS

CN 108924817 A 11/2018
CN 110072285 A 7/2019
(Continued)

OTHER PUBLICATIONS

International Search Report of PCT/CN2021/100372 dated Mar. 1, 2022 with English translation, (4p).
(Continued)

*Primary Examiner* — Kwasi Karikari
(74) *Attorney, Agent, or Firm* — Arch & Lake LLP

(57) ABSTRACT

A communication state changing method and apparatus. The communication state changing method is applied to a terminal equipped with a plurality of SIM cards, and the plurality of SIM cards at least include a first SIM card. The communication state changing method includes: acquiring first information, which is sent by a first network device, wherein the first information comprises configuration information for automatically changing a communication state during the process of a terminal communicating with a network to which a first SIM card belongs, and the first network device is a network device in the network to which the first SIM card belongs.

20 Claims, 4 Drawing Sheets

Acquire first information sent by a first network device, the first information including configuration information for automatic change of a communication state during communication between a terminal and a network to which a first SIM card belongs

S11

(58) Field of Classification Search
CPC ........... H04W 52/028; H04W 52/0209; H04W 52/0264; H04W 88/02; H04W 36/08; H04W 52/02; H04W 48/20; H04W 72/56; H04W 72/563; H04W 36/0085; H04W 40/36; H04W 88/08
See application file for complete search history.

(56) References Cited

U.S. PATENT DOCUMENTS

| | | | | |
|---|---|---|---|---|
| 2021/0105606 | A1* | 4/2021 | Bendlin | H04W 60/005 |
| 2022/0053448 | A1* | 2/2022 | Velev | H04W 76/27 |
| 2022/0210632 | A1* | 6/2022 | Tseng | H04W 8/183 |

FOREIGN PATENT DOCUMENTS

| | | | |
|---|---|---|---|
| CN | 110546993 | A | 12/2019 |
| CN | 111385787 | A | 7/2020 |
| CN | 111512657 | A | 8/2020 |
| CN | 111727618 | A | 9/2020 |
| CN | 12913266 | A | 6/2021 |
| WO | 2020227879 | A1 | 11/2020 |

OTHER PUBLICATIONS

The First Office Action issued in Application No. 202180001829.1 dated Jul. 15, 2025, (20p).

Apple Inc, "Methods for MUSIM Network Switching" 3GPP TSG-RAN WG2 Meeting #113e Electronic, Jan. 25, 2021 to Feb. 5, 2021, R2-2100850 (8p).

Lenovo, Motorola Mobility, "Definition and solution for paging collision, RRC Inactive, SI change", 3GPP TSG-RAN WG2 Meeting #114 electronic Online, May 19-May 27, 2021, R2-2105075 (5p).

Vivo, "[AT113-e][242][NR][Multi-SIM] NAS vs. RRC signalling for paging collision and network switching (vivo)", 3GPP TSG-RAN WG2 Meeting #113-e Online, Jan. 25-Feb. 5, 2021, R2-2101981 (25p).

* cited by examiner

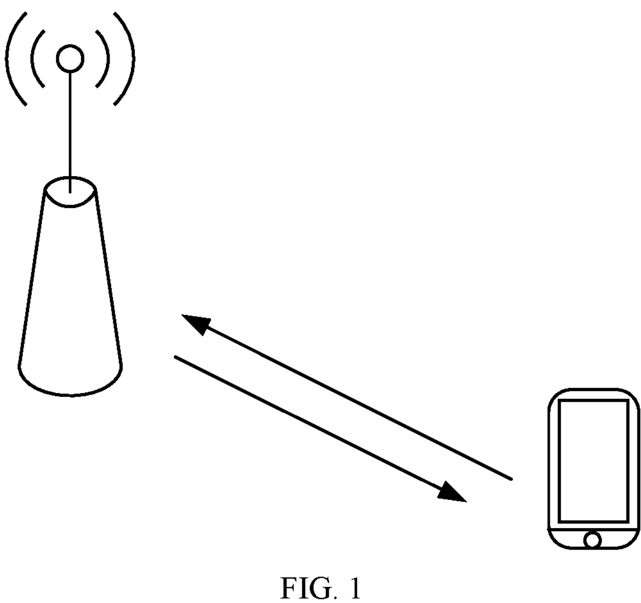

FIG. 1

Acquire first information sent by a first network device, the first information including configuration information for automatic change of a communication state during communication between a terminal and a network to which a first SIM card belongs

Acquire first information sent by a first network device, the first information including configuration information for a first SIM card to change from a connected state to an idle state

Acquire first information sent by a first network device, the first information including configuration information for a first SIM card to change from a connected state to an inactive state

Figures 5, 6, 7, 8, 9:
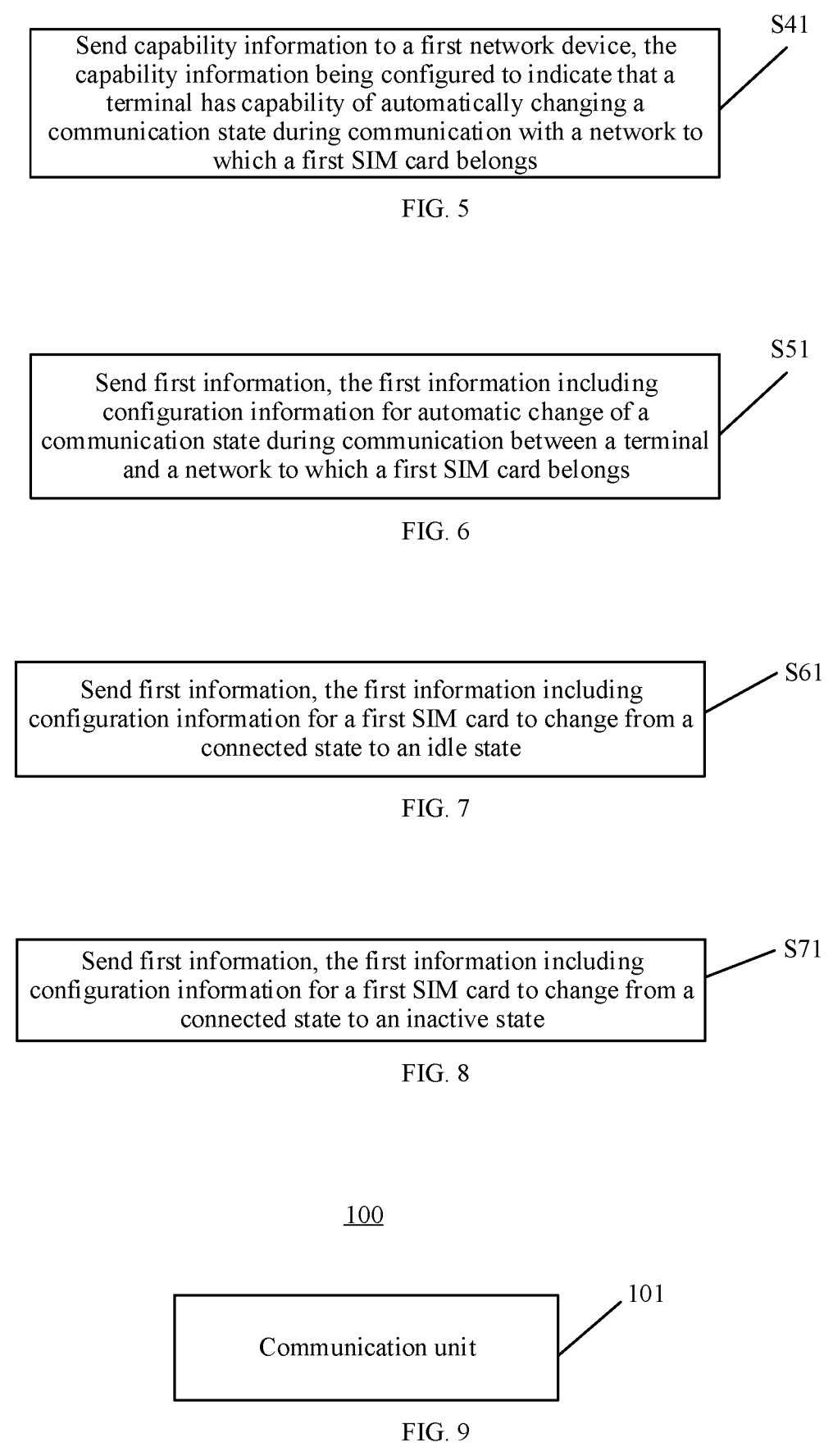

Send capability information to a first network device, the capability information being configured to indicate that a terminal has capability of automatically changing a communication state during communication with a network to which a first SIM card belongs

Send first information, the first information including configuration information for automatic change of a communication state during communication between a terminal and a network to which a first SIM card belongs

Send first information, the first information including configuration information for a first SIM card to change from a connected state to an idle state

Send first information, the first information including configuration information for a first SIM card to change from a connected state to an inactive state

Communication unit

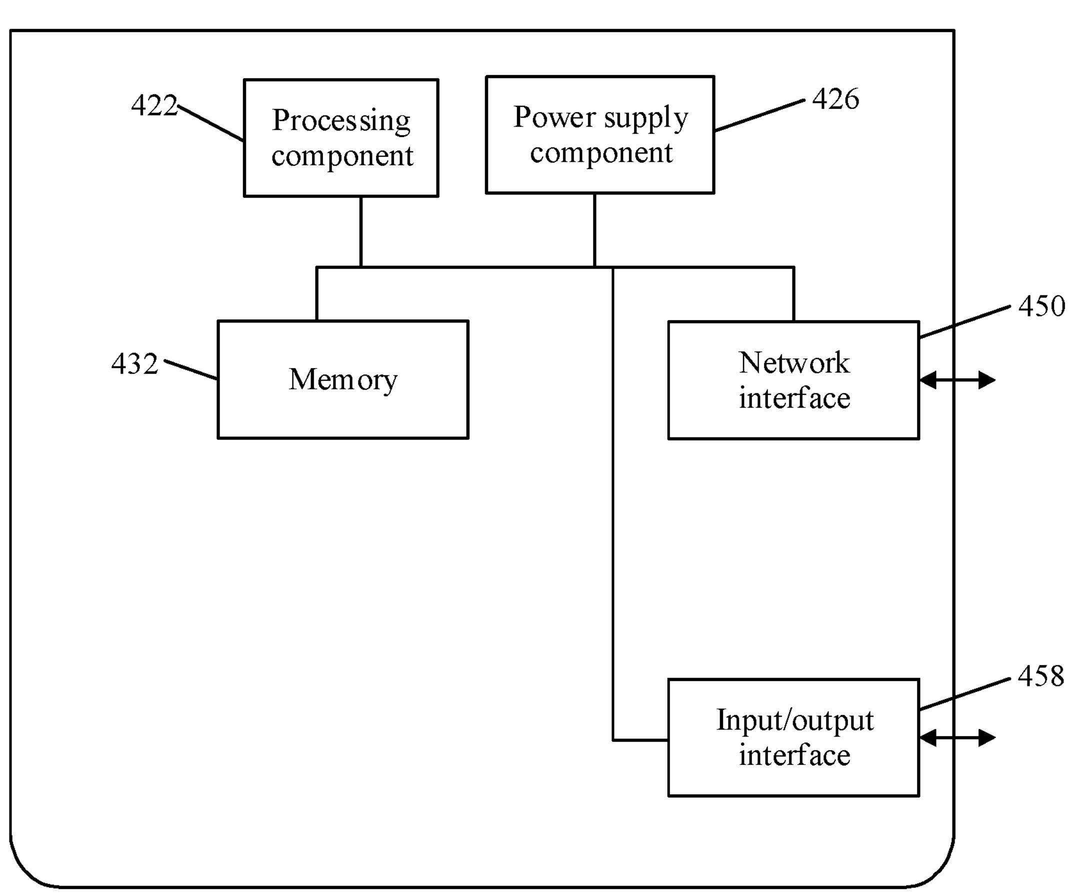
FIG. 12

COMMUNICATION STATUS CHANGING METHOD AND APPARATUS

CROSS-REFERENCE TO RELATED APPLICATIONS

The present application is a U.S. national phase application of International Application No. PCT/CN2021/100372, filed on Jun. 16, 2021, the disclosure of which is incorporated herein by reference in its entirety for all purposes.

BACKGROUND

With the development of wireless communication technologies, terminals equipped with a plurality of Subscriber Identification Module (SIM) cards are increasingly widely used.

SUMMARY

The present disclosure relates to the field of communication technologies, and in particular to a method and apparatus for changing a communication state.

The present disclosure provides a method and apparatus for changing a communication state.

According to a first aspect of embodiments of the present disclosure, there is provided a method for changing a communication state, which is applied to a terminal equipped with a plurality of SIM cards, and the plurality of SIM cards include at least a first SIM card. The method for changing the communication state includes:

acquiring first information sent by a first network device, wherein the first information includes configuration information for automatic change of a communication state during communication between the terminal and a network to which the first SIM card belongs, and the first network device is a network device in the network to which the first SIM card belongs.

According to a second aspect of embodiments of the present disclosure, there is provided a method for changing a communication state, which is applied to a network device. The network device is a network device in a network to which a first SIM card belongs, and the method for changing the communication state includes:

sending first information, wherein the first information includes configuration information for automatic change of a communication state during communication between a terminal and the network to which the first SIM card belongs.

According to a third aspect of embodiments of the present disclosure, there is provided an apparatus for changing a communication state, including:

a processor; and a memory configured to store instructions executable by the processor;

wherein the processor is configured to perform the method for changing the communication state described in the first aspect or any implementation of the first aspect.

It should be noted that the above general description and the following detailed description are merely illustrative and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and together with the description serve to explain the principles of the present disclosure.

FIG. 1 illustrates a schematic diagram of a wireless communication system according to some embodiments of the present disclosure.

FIG. 2 illustrates a flowchart of a method for changing a communication state according to some embodiments of the present disclosure.

FIG. 3 illustrates a flowchart of a method for changing a communication state according to some embodiments of the present disclosure.

FIG. 4 illustrates a flowchart of a method for changing a communication state according to some embodiments of the present disclosure.

FIG. 5 illustrates a flowchart of a method for changing a communication state according to some embodiments of the present disclosure.

FIG. 6 illustrates a flowchart of a method for changing a communication state according to some embodiments of the present disclosure.

FIG. 7 illustrates a flowchart of a method for changing a communication state according to some embodiments of the present disclosure.

FIG. 8 illustrates a flowchart of a method for changing a communication state according to some embodiments of the present disclosure.

FIG. 9 illustrates a block diagram of an apparatus for changing a communication state according to some embodiments of the present disclosure.

FIG. 12 illustrates a block diagram of a device for changing a communication state according to some embodiments of the present disclosure.

DETAILED DESCRIPTION

Figure 10:
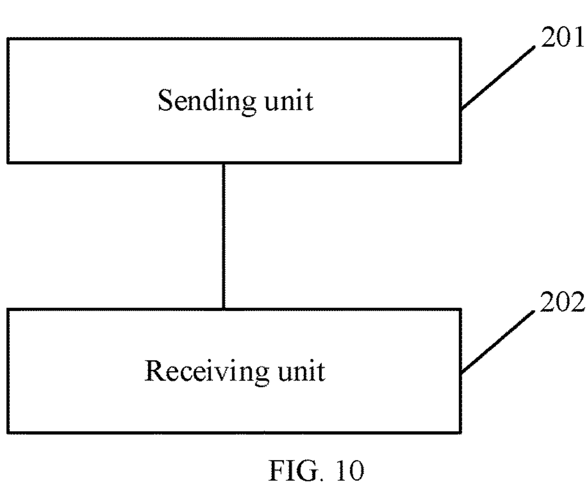
FIG. 10 illustrates a block diagram of an apparatus for changing a communication state according to some embodiments of the present disclosure.

The illustrative embodiments will be described in detail here, examples of which are illustrated in the accompanying drawings. In the following description, when reference is made to the accompanying drawings, the same reference numbers in different figures represent the same or similar elements unless otherwise indicated. The implementations set forth in the following description of the illustrative embodiments do not represent all implementations consistent with the present disclosure. Instead, they are merely examples of apparatuses and methods consistent with some aspects of the present disclosure as recited in the appended claims.

In the related arts, when a terminal equipped with a plurality of SIM cards performs communication, it needs to perform communication processing between networks to which the plurality of SIM cards belong. For example, when a communication service is performed in a network to which one SIM card belongs (hereinafter referred to as a current network, or a first communication system), it needs to perform operation processing for the communication service in a network to which another SIM card belongs (hereinafter referred to as a second communication system). In this case, some issues may occur. For example, when a multi-card terminal is in communication with the first communication system, it needs to detect the second communication system from time to time, for example, monitor paging, perform measurement, read system messages, etc., which may have an impact on performance of the first communications system. If no operation for the second communication system is performed, for example, if no paging is monitored, the service of the second communication system may never be established. Moreover, when the terminal equipped with the plurality of SIM cards receives a paging message on the second communication system, it also needs to decide whether it needs to respond to the paging, and this is based on rules configured by a user. If the terminal equipped with the plurality of SIM cards does not respond to the paging message of the second communication system, the second communication system will continue to page the terminal until the maximum number of times of paging is reached, which, on the one hand, will waste signaling resources, and on the other hand, will trigger error statistics or operations of the second system.

A method for changing a communication state provided by embodiments of the present disclosure may be applied to a wireless communication system as shown in FIG. 1. Referring to FIG. 1, the wireless communication system includes a terminal and a network device. The terminal is connected to the network device through a radio resource and performs data transmission and reception.

It can be understood that the wireless communication system shown in FIG. 1 is merely a schematic illustration, and the wireless communication system may further include other network devices, such as a core network device, a wireless relay device, and a wireless backhaul device, which are not shown in FIG. 1. The number of network devices and the number of terminals included in the wireless communication system are not limited in the embodiments of the present disclosure.

It can be further understood that the wireless communication system in the embodiments of the present disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to factors such as capacity, speed, delay and others of different networks, the networks may be divided into a 2G (generation) network, a 3G network, a 4G network or a future evolution network, such as a 5G network. The 5G network may also be referred to as a new radio (NR) network. For convenience of description, the wireless communication network may sometimes be referred to simply as a network in the present disclosure.

Further, the network device involved in the present disclosure may also be referred to as a radio access network device. The radio access network device may be a base station, an evolved node B (eNB), a home base station, an access point (AP) in a wireless fidelity (WI-FI) system, a wireless relay node, a wireless backhaul node, a transmission point (TP) or a transmission and reception point (TRP), etc., may also be a gNB in the NR system, or may also be a component or part of devices that constitute the base station. When the wireless communication system is a vehicle-to-everything (V2X) communication system, the network device may also be a vehicle-mounted device. It can be understood that the specific technologies and specific device forms adopted for the network device are not limited in the embodiments of the present disclosure.

Further, the terminal involved in the present disclosure may also be referred to as a terminal device, user equipment (UE), a mobile station (MS), a mobile terminal (MT), etc., and is a device that provides voice and/or data connectivity to a user. For example, the terminal may be a handheld device with a wireless connectivity function, a vehicle-mounted device, etc. At present, some examples of the terminal include a mobile phone, a pocket personal computer (PPC), a palm computer, a personal digital assistant (PDA), a notebook computer, a tablet computer, a wearable device, a vehicle-mounted device, or the like. In addition, when the wireless communication system is the vehicle-to-everything (V2X) communication system, the terminal device may also be a vehicle-mounted device. It can be understood that the specific technologies and specific device forms adopted for the terminal are not limited in the embodiments of the present disclosure.

A terminal related to embodiments of the present disclosure has a communication card slot for installing a SIM card, and the number of communication card slots may be one or more. The present disclosure mainly focuses on the terminal with a plurality of communication card slots and equipped with a plurality of SIM cards.

The SIM card may also be called a subscriber identification module, a smart card, etc. SIM card information is stored on the SIM card, and the SIM card information may include, for example, information for distinguishing between users, encryption keys, user's phone books and other contents. For example, International Mobile Subscriber Identification Number (IMSI) is stored for identity authentication by a network. The SIM card can be installed in the terminal and has an operator network to which the SIM card belongs. The operator network can provide network services to the terminal through a network device. Different operators can provide different network services to the terminal, which can also be understood as that different operators correspond to different operator networks. "Operator network", "network" and "system" are sometimes used interchangeably in the present disclosure, but those skilled in the art can understand the meanings thereof A plurality of terminals may be included in the wireless communication system shown in FIG. 1. The present disclosure is applicable to a scenario where a terminal equipped with a plurality of SIM cards performs communication with the network.

In the present disclosure, for convenience of description, the terminal equipped with the plurality of SIM cards is sometimes referred as to a multi-card terminal. Any two different SIM cards among the plurality of SIM cards installed in the multi-card terminal are called a first SIM card and a second SIM card. A network to which the first SIM card belongs is called a first network (or a first communication system), and a network to which the second SIM card belongs is called a second network (or a second communication system). A network device in the first network that communicates with the terminal through the first SIM card is called a first network device, and a network device in the second network that communicates with the terminal through the second SIM card is called a second network device.

In the related arts, when the terminal is performing communication service with the first network to which the first SIM card belongs, the communication performance may be degraded due to the communication of the second network to which the second SIM card belongs being not processed in a timely manner. For example, it causes a waste of signaling resources and triggers error statistics or operations of the second network.

In the related arts, a communication state for the terminal to communicate with the network includes an idle state, an inactive state and a connected state. When the multi-card terminal performs communication with the network, the communication state may be changed to perform corresponding communication service processing. For example, when the multi-card terminal is performing communication service with the first network to which the first SIM card belongs through the first SIM card, the first SIM card may be in the connected state, and the second SIM card may be in the idle state and/or inactive state. When the communication state of the first SIM card changes from the connected state to the idle state and/or inactive state, the communication state of the second SIM card may be changed to the connected state, and the multi-card terminal performs communication with the second network through the second SIM card.

In view of this, embodiments of the present disclosure provide a method for changing a communication state. In the method for changing the communication state, the multi-card terminal that is performing communication with the first network can automatically change the communication state. For example, the multi-card terminal may change a communication state of the first SIM card to the inactive state or the idle state in a timely manner, so that the second SIM card of the multi-card terminal can perform communication with the second network, thereby improving the communication performance.

In embodiments of the present disclosure, that the terminal automatically changes the communication state can be understood as that the terminal itself makes a communication state decision and changes the communication state according to actual service requirements.

In an implementation of the present disclosure, the network device may configure configuration information for automatic change of a communication state for the SIM card connected to the network device. For example, the first network device may configure for the multi-card terminal the configuration information for automatic change of the communication state of the first SIM card.

For the convenience of description, the first SIM card included in the plurality of SIM cards is taken as an example below to illustrate a process of automatically changing the communication state. The implementations of the process of automatically changing the communication state of other SIM cards among the plurality of SIM cards that are different from the first SIM card are similar, which will not be introduced in embodiments of the present disclosure one by one.

FIG. 2 illustrates a flowchart of a method for changing a communication state according to an illustrative embodiment of the present disclosure. As shown in FIG. 2, the method for changing the communication state is used in a terminal and includes step S11.

In step S11, first information sent by a first network device is acquired.

The first information includes configuration information for automatic change of a communication state during communication between the terminal and a network to which the first SIM card belongs. The first network device is a network device which performs communication with the terminal in the network to which the first SIM card belongs.

The first network device can also be understood as a network device such as a base station in the network to which the first SIM card belongs, that has established a communication connection with the terminal. For example, the first network device may be a first base station to which the first SIM card is connected.

In an embodiment of the present disclosure, the first network device may configure the configuration information for automatic change of the communication state for the first SIM card connected to the first network device. The multi-card terminal acquires the configuration information for the automatic change of the communication state configured by the first network device, so as to perform the automatic change of the communication state subsequently.

In the method for changing the communication state provided by the embodiments of the present disclosure, the multi-card terminal that performs the automatic change of the communication state may be in a connected state in which the multi-card terminal is performing communication with the first network through the first SIM card. In a subsequent process of changing the communication state, the connected state may be changed to an idle state and/or an inactive state.

In an embodiment of the present disclosure, the configuration information for the automatic change of the communication state configured by the first network device may include at least one of: configuration information for the first SIM card to change from the connected state to the idle state, and configuration information for the first SIM card to change from the connected state to the inactive state.

In an implementation of the embodiments of the present disclosure, the first network device may configure, for the multi-card terminal, the configuration information for the first SIM card to automatically change from the connected state to the idle state. That is, the first information acquired by the terminal includes the configuration information for the first SIM card to automatically change from the connected state to the idle state.

FIG. 3 is a flowchart showing a method for changing a communication state according to an illustrative embodiment of the present disclosure. As shown in FIG. 3, the method for changing the communication state is used in a terminal and includes step S21.

In step S21, first information sent by a first network device is acquired.

The first information includes configuration information for the first SIM card to change from a connected state to an idle state.

In an implementation, the first information includes information on a time duration required for the first SIM card to change from the connected state to the idle state.

The information on the time duration required for the first SIM card to change from the connected state to the idle state may be implemented through a timer. That is, the configuration information for the automatic change of the communication state configured by the first network device may include a timer duration required for the first SIM card to change from the connected state to the idle state.

In an implementation, the information on the time duration includes information of a timer duration after the first SIM card sends a leave request signaling to the first network device. The leave request signaling is configured to request to leave the network to which the first SIM card belongs. In a case that the first SIM card changes from the connected state to the idle state, the terminal may send the leave request signaling to the first network device through the first SIM card. That is, a timer for the automatic change of the communication state by the first SIM card may start timing after the leave request signaling is sent to the first network device by the multi-card terminal through the first SIM card, and after the timer reaches the timer duration required for the first SIM card to change from the connected state to the idle state, the first SIM card changes from the connected state to the idle state.

In the method for changing the communication state provided by the embodiments of the present disclosure, the information on the time duration required for the first SIM card to change from the connected state to the idle state has correspondence with the terminal service scenario, that is, the network device may set different time duration information for different service scenarios performed by the terminal, and notify the multi-card terminal through the first information. The multi-card terminal determines the time duration information matching the current service scenario based on the correspondence between the duration information and the terminal service scenarios, and controls the first SIM card to change from the connected state to the idle state based on the time duration information.

In an implementation of the embodiments of the present disclosure, the first network device may configure, for the multi-card terminal, the configuration information for the first SIM card to automatically change from the connected state to the inactive state. That is, the first information acquired by the terminal includes the configuration information for the first SIM card to change from the connected state to the inactive state.

FIG. 4 is a flowchart showing a method for changing a communication state according to an illustrate embodiment of the present disclosure. As shown in FIG. 4, the method for changing the communication state is used in a terminal and includes step S31.

In step S31, first information sent by a first network device is acquired.

The first information includes configuration information for a first SIM card to change from a connected state to an inactive state.

In an implementation of the present disclosure, the configuration information for the first SIM card to change from the connected state to the inactive state includes at least one of.

Inactive Radio Network Temporary Identifier (I-RNTI) configuration information; Radio Access Network-based Notification Area (RNA) configuration information; and paging cycle configuration information.

In an embodiment of the present disclosure, during a process of performing communication with the network to which the first SIM card belongs, the multi-card terminal can automatically change the communication state based on the configuration information for the automatic change of the communication state, so that the terminal equipped with the plurality of SIM cards can communicate with the network to which the second SIM card belongs in a timely manner, improving the communication performance.

In an implementation of the embodiments of the present disclosure, the network device may configure the configuration information for the automatic change of the communication state based on Radio Resource Control (RRC) information. That is, the multi-card terminal may acquire the first information sent by the first network device based on RRC signaling.

In the embodiments of the present disclosure, for the convenience of description, the RRC for configuring the configuration information for the automatic change of the communication state is called a first RRC.

In an implementation, the first information is carried in other configuration (OtherConfig) signaling in the first RRC, where the OtherConfig signaling can be understood as signaling that does not carry information in the RRC signaling.

In an implementation, in response to that the network to which the first SIM card belongs is an Evolved-UMTS Terrestrial Radio Access Network (E-UTRAN), the first information is carried in OtherConfig signaling of RRCConnectionReconfiguration. Alternatively, in response to that the network to which the first SIM card belongs is a New Radio (NR) network, the first information is carried in OtherConfig signaling of RRCReconfiguration.

In the method for changing the communication state provided by the embodiments of the present disclosure, the multi-card terminal may send to the first network device capability information that it has capability of controlling the first SIM card to automatically change the communication state, so that the first network device determines, based on the capability information, the configuration information for the automatic change of the communication state.

FIG. 5 is a flowchart showing a method for changing a communication state according to an illustrative embodiment of the present disclosure. As shown in FIG. 5, the method for changing the communication state is used in a terminal and includes step S41.

In step S41, capability information is sent to a first network device, where the capability information is configured to indicate that the terminal has capability of automatically changing the communication state during a process of performing communication with a network to which a first SIM card belongs.

In an implementation, the capability information is configured to indicate that the terminal has capability of automatically changing to an idle state and/or an inactive state during the process of performing communication with the network to which the first SIM card belongs.

In an implementation of the present disclosure, the multi-card terminal may report the capability information based on RRC signaling. Hereinafter, the RRC signaling for reporting the capability information is called a second RRC. That is, the multi-card terminal sends the capability information to the first network device based on the second RRC.

For the E-UTRAN network, the second RRC signaling may be UE-EUTRA-Capability signaling. More specifically, the capability information may be reported in OtherParameters information unit in the UE-EUTRA-Capability signaling. For the NR network, the second RRC signaling may be UE-NR-Capability signaling, and more specifically, the capability information may be reported in the UE-NR-Capability signaling.

In an embodiment of the present disclosure, after receiving the capability information reported by the multi-card terminal, the first network device may configure, based on the capability information, the configuration information for automatic change of the communication state.

In an implementation, the first network device may configure, for the multi-card terminal, configuration information of whether to allow the terminal to automatically change the communication state during the process of performing communication with the network to which the first SIM card belongs, which is hereinafter referred to as second information. The network device sends the second information to the terminal, and the second information is configured to indicate whether the terminal is allowed to automatically change the communication state during the process of performing communication with the network to which the first SIM card belongs.

That is, the terminal acquires the second information sent by the first network device, and the second information is configured to indicate whether the terminal is allowed to automatically change the communication state during the process of performing communication with the network to which the first SIM card belongs.

In another implementation, in response to the second information indicating that the terminal is allowed to automatically change the communication state during the process of performing communication with the network to which the first SIM card belongs, the network device may send third information to the terminal, and the third information is configured to indicate configuration information adapted for the terminal to automatically change the communication state at present. That is, the third information is configured to indicate to perform the automatic change of the communication state and is adapted for the configuration information of the current service state of the terminal. The terminal receives the third information and automatically changes the communication state based on the third information.

In an embodiment of the present disclosure, the terminal determines, based on a service requirement, whether to perform the automatic change of the communication state. In a case that it is determined that the automatic state change is required, the automatic change of the communication state may be performed based on the configuration information for the automatic change of the communication state configured by the first network device. In an example, during the process of performing communication with the network to which the first SIM card belongs, the terminal automatically changes the communication state based on the configuration information for the automatic change of the communication state, and performs communication with the network of the second SIM card.

For example, the multi-card terminal that is performing communication with the first network to which the first SIM card belongs can automatically change the communication state of the first SIM card from the connected state to the idle state or inactive state, establish a communication connection with a second network device in the second network through the second SIM card, and performs communication with the second network. For example, the second network device may be a second base station that establishes a communication connection with the second SIM card.

In an embodiment of the present disclosure, the first SIM card that is changed to the idle state or the inactive state may change the communication state to the connected state according to the service requirements. For example, in the inactive state, the first SIM card can quickly restore to the connected state.

Based on the same inventive concept, embodiments of the present disclosure provide a method for changing a communication state that is applied to a network device. In the following, the description will be provided in an example where the network device is the first network device in the network to which the first SIM card belongs. For network devices in networks to which other SIM cards belong, the method for changing the communication state is similar and will not be described in detail here.

FIG. 6 is a flowchart showing a method for changing a communication state according to an illustrative embodiment of the present disclosure. As shown in FIG. 6, the method for changing the communication state is used in a network device and includes step S51.

In step S51, first information is sent, where the first information includes configuration information for automatic change of a communication state during communication between a terminal and a network to which a first SIM card belongs.

In an embodiment of the present disclosure, the configuration information for the automatic change of the communication state configured by the first network device may include at least one of: configuration information for the first SIM card to change from a connected state to an idle state, and configuration information for the first SIM card to change from the connected state to an inactive state.

In an implementation of embodiments of the present disclosure, the first network device may configure, for the multi-card terminal, the configuration information for the first SIM card to automatically change from the connected state to the idle state. That is, the first information includes the configuration information for the first SIM card to automatically change from the connected state to the idle state.

FIG. 7 is a flowchart showing a method for changing a communication state according to an illustrative embodiment of the present disclosure. As shown in FIG. 7, the method for changing the communication state is used in a first network device and includes step S61.

In step S61, first information is sent, where the first information includes configuration information for the first SIM card to change from a connected state to an idle state.

In an implementation, the first information includes information on a time duration required for the first SIM card to change from the connected state to the idle state.

The information on the time duration required for the first SIM card to change from the connected state to the idle state may be implemented through a timer. That is, the configuration information for the automatic change of the communication state configured by the first network device may include a timer duration required for the first SIM card to change from the connected state to the idle state.

In an implementation, the information on the time duration includes information of a timer duration after the first SIM card sends a leave request signaling to the network to which the first SIM card belongs. The leave request signaling is configured to request to leave the network to which the first SIM card belongs.

In the method for changing the communication state provided by the embodiments of the present disclosure, the information on the time duration required for the first SIM card to change from the connected state to the idle state has correspondence with a terminal service scenario, that is, the network device may set different time duration information for different service scenarios performed by the terminal, and notify the multi-card terminal through the first information.

In an implementation of the embodiments of the present disclosure, the first network device may configure, for the multi-card terminal, configuration information for the first SIM card to automatically change from the connected state to the inactive state. That is, the first information sent by the first network device includes the configuration information for the first SIM card to change from the connected state to the inactive state.

FIG. 8 is a flowchart showing a method for changing a communication state according to an illustrative embodiment of the present disclosure. As shown in FIG. 8, the method for changing the communication state is used in a first network device and includes step S71.

In step S71, first information is sent, where the first information includes configuration information for a first SIM card to change from a connected state to an inactive state.

In an implementation of the present disclosure, the configuration information for the first SIM card to change from the connected state to the inactive state includes at least one of: I-RNTI configuration information; RNA configuration information; and paging cycle configuration information.

In an implementation, the first network device may send the first information based on a first RRC.

In an implementation, the first information is carried in OtherConfig signaling in the first RRC.

In an implementation, in response to that the network to which the first SIM card belongs is an E-UTRAN, the first information is carried in OtherConfig signaling of RRCConnectionReconfiguration. Alternatively, in response to that the network to which the first SIM card belongs is a NR network, the first information is carried in OtherConfig signaling of RRCReconfiguration.

In the method for changing the communication state provided by the embodiments of the present disclosure, the first network device may also receive capability information sent by the terminal, and the capability information is configured to indicate that the terminal has capability of automatically changing the communication state during a process of performing communication with a network to which the first SIM card belongs.

In an implementation, the capability information is configured to indicate that the terminal has capability of automatically changing to an idle state and/or an inactive state during the process of performing communication with the network to which the first SIM card belongs.

The first network device may receive the capability information sent by the terminal based on a second RRC.

For the E-UTRAN network, the second RRC signaling may be UE-EUTRA-Capability signaling. For example, the capability information sent by the terminal may be acquired from an OtherParameters information unit in the UE-EUTRA-Capability signaling.

For the NR network, the second RRC signaling may be UE-NR-Capability signaling. For example, the capability information sent by the terminal may be acquired in the UE-NR-Capability signaling.

In an embodiment of the present disclosure, after receiving the capability information reported by the multi-card terminal, the first network device may configure, based on the capability information, the configuration information for the automatic change of the communication state.

In an implementation, the first network device may configure for the multi-card terminal the configuration information of whether to allow the terminal to automatically change the communication state during the process of performing communication with the network to which the first SIM card belongs, which is hereinafter referred to as second information. The network device sends the second information to the terminal, and the second information is configured to indicate whether the terminal is allowed to automatically change the communication state during the process of performing communication with the network to which the first SIM card belongs.

In another implementation, in response to the second information indicating that the terminal is allowed to automatically change the communication state during the process of performing communication with the network to which the first SIM card belongs, the network device may send third information to the terminal, and the third information is configured to indicate the configuration information adapted for the terminal to automatically change the communication state at present. That is, the third information is configured to indicate to perform the automatic change of the communication state and is adapted for the configuration information of the current service state of the terminal.

In the method for changing the communication state provided by the embodiments of the present disclosure, the network device configures the first information for the terminal, and the first information includes the configuration information for the automatic change of the communication state during the communication between the terminal and the network to which the first SIM card belongs. Therefore, the terminal equipped with the plurality of SIM cards can automatically change the communication state based on the configuration information during the process of performing communication with the network to which the first SIM card belongs, so that the terminal equipped with the plurality of SIM cards can perform communication with the network to which the second SIM card belongs in a timely manner, improving the communication performance.

It can be understood that the method for changing the communication state provided by the embodiments of the present disclosure can be applied to a process in which a terminal interacts with a network device to implement the automatic change of the communication state.

In a case that the terminal interacts with the network device to implement the automatic change of the communication state, when the terminal determines that the communication state needs to be changed, the terminal may send a leave request signaling to the network device to request, to a first network device, a communication state of a first SIM card be changed to an idle state or an inactive state. In response to the leave request signaling, the first network device may indicate whether to approve the terminal to change the communication state of the first SIM card, and/or indicate specific configuration information for changing the communication state of the first SIM card. Alternatively, the first network device may not respond to the leave request signaling, and the terminal may change the communication state on its own according to service requirements.

It should be noted that in the embodiments of the present disclosure, in the process in which the network device and the terminal interact with each other to implement the automatic change of the communication state, the network device and the terminal have roles and functions of respectively implementing the communication state change by the network device and the terminal as described in the above embodiments, and for specific implementations, reference may be made to the relevant descriptions of the above embodiments, which will not be described again here.

It should be noted that those skilled in the art can understand that various implementations/embodiments involved in the foregoing embodiments of the present disclosure may be used in conjunction with the foregoing embodiments, or may be used independently. Whether used alone or in conjunction with the foregoing embodiments, the implementation principles thereof are similar. In the embodiments of the present disclosure, some of the embodiments are described by means of illustrating the implementations that are used together. Those skilled in the art can understand that such illustrative description are not intended to limit the embodiments of the present disclosure.

Based on the same idea, the embodiments of the present disclosure further provide an apparatus for changing a communication state.

It should be understood that, in order to achieve the aforementioned functions, the apparatus for changing the communication state provided by the embodiments of the present disclosure includes corresponding hardware structures and/or software modules for performing the respective functions. In connection with the units and algorithmic steps in the examples disclosed in the embodiments of the present disclosure, the embodiments of the present disclosure can be implemented in the form of hardware or a combination of hardware and computer software. Whether a certain function is implemented in hardware or computer software driving hardware depends on the particular application and design constraints of the technical solutions. A person skilled in the art may employ a different approach for each particular application to implement the described functions, and such implementations should not be considered as going beyond the scope of the technical solutions of the embodiments of the present disclosure.

FIG. 9 is a block diagram showing an apparatus for changing a communication state according to an illustrative embodiment of the present disclosure. Referring to FIG. 9, the apparatus 100 for changing the communication state is applied to a terminal equipped with a plurality of SIM cards, the plurality of SIM cards at least include a first SIM card, and the apparatus for changing the communication state includes a communication unit 101.

The communication unit 101 is configured to acquire first information sent by a first network device, where the first information includes configuration information for automatic change of a communication state during communication between the terminal and a network to which the first SIM card belongs, and the first network device is a network device in the network to which the first SIM card belongs.

In an implementation, the first information includes configuration information for the first SIM card to change from a connected state to an idle state.

In an implementation, the first information includes information on a time duration required for the first SIM card to change from the connected state to the idle state.

In an implementation, the information on the time duration includes information of a timer duration after a leave request signaling is sent by the first SIM card to the network to which the first SIM card belongs, and the leave request signaling is configured to request to leave the network to which the first SIM card belongs.

In an implementation, the first information further includes correspondence between the information on the time duration and terminal service scenarios.

In an implementation, the first information includes the configuration information for the first SIM card to change from a connected state to an inactive state.

In an implementation, the first information includes at least one of:

inactive radio network temporary identifier configuration information; radio access network-based notification area configuration information; and paging cycle configuration information.

In an implementation, the communication unit 101 acquires the first information sent by the first network device based on first radio resource control information.

In an implementation, the first information is carried in OtherConfig signaling in the first radio resource control information.

In an implementation, in response to that the network to which the first SIM card belongs is an evolved UMTS terrestrial radio access network, the first information is carried in OtherConfig signaling of RRCConnectionReconfiguration; or in response to that the network to which the first SIM card belongs is a new radio network, the first information is carried in OtherConfig signaling of RRCReconfiguration.

In an implementation, the communication unit 101 is further configured to:

send capability information to the first network device, where the capability information is configured to indicate that the terminal has capability of automatically changing the communication state during the communication with the network to which the first SIM card belongs.

In an implementation, the capability information is configured to indicate that the terminal has capability of automatically changing to an idle state and/or an inactive state during the communication with the network to which the first SIM card belongs.

In an implementation, the communication unit 101 sends the capability information to the first network device based on second radio resource control information.

In an implementation, the communication unit 101 is further configured to: acquire second information sent by the first network device, and the second information is configured to indicate whether the terminal is allowed to automatically change the communication state during the communication with the network to which the first SIM card belongs.

In an implementation, the communication unit 101 is further configured to receive third information in response to the second information indicating that the terminal is allowed to automatically change the communication state during the communication with the network to which the first SIM card belongs; and the third information is configured to indicate to perform the automatic change of the communication state, and is adapted for the configuration information for a current service state of the terminal.

In an implementation, the communication unit 101 is further configured to: during the process of performing communication with the network to which the first SIM card belongs, automatically change the communication state based on the configuration information for the automatic change of the communication state, and perform communication with a network of a second SIM card.

FIG. 10 is a block diagram showing an apparatus for changing a communication state according to an illustrative embodiment of the present disclosure. Referring to FIG. 10, the apparatus 200 for changing a communication state is applied to a network device which is a network device in a network to which a first SIM card belongs. The apparatus 200 for changing the communication state includes a sending unit 201.

The sending unit 201 is configured to send first information, where the first information includes configuration information for automatic change of a communication state during communication between a terminal and the network to which the first SIM card belongs.

In an implementation, the first information includes configuration information for the first SIM card to change from a connected state to an idle state.

In an implementation, the first information includes information on a time duration required for the first SIM card to change from the connected state to the idle state.

In an implementation, the information on the time duration includes information of a timer duration after a leave request signaling is sent by the first SIM card to the network to which the first SIM card belongs.

In an implementation, the first information further includes correspondence between the information on the time duration and a terminal service scenario.

In an implementation, the first information includes configuration information for the first SIM card to change from a connected state to an inactive state.

In an implementation, the first information includes at least one of:

inactive radio network temporary identifier configuration information; radio access network-based notification area configuration information; and paging cycle configuration information.

In an implementation, the sending unit 201 sends the first information based on first radio resource control information.

In an implementation, the first information is carried in OtherConfig signaling in the first radio resource control information.

In an implementation, in response to that the network to which the first SIM card belongs is an evolved UMTS terrestrial radio access network, the first information is carried in OtherConfig signaling of RRCConnectionReconfiguration; or in response to that the network to which the first SIM card belongs is a new radio network, the first information is carried in OtherConfig signaling of RRCReconfiguration.

In an implementation, the apparatus 200 for changing the communication state further includes a receiving unit 202 configured to receive capability information sent by the terminal, where the capability information is configured to indicate that the terminal has capability of automatically changing the communication state during the communication with the network to which the first SIM card belongs.

In an implementation, the capability information is configured to indicate that the terminal has capability of automatically changing to an idle state and/or an inactive state during the communication with the network to which the first SIM card belongs.

In an implementation, the receiving unit 202 receives the capability information sent by the terminal based on second radio resource control information.

In an implementation, the sending unit 201 is further configured to send second information, and the second information is configured to indicate whether the terminal is allowed to automatically change the communication state during the communication with the network to which the first SIM card belongs.

In an implementation, the sending unit 201 is further configured to send third information in response to the second information indicating that the terminal is allowed to automatically change the communication state during the communication with the network to which the first SIM card belongs; and the third information is configured to indicate to perform the automatic change of the communication state, and is adapted for the configuration information for a current service state of the terminal.

Regarding the apparatus in the foregoing embodiments, specific manners in which the modules perform operations have been described in detail in the embodiments related to the method, and will not be described in detail here.

Figure 11:
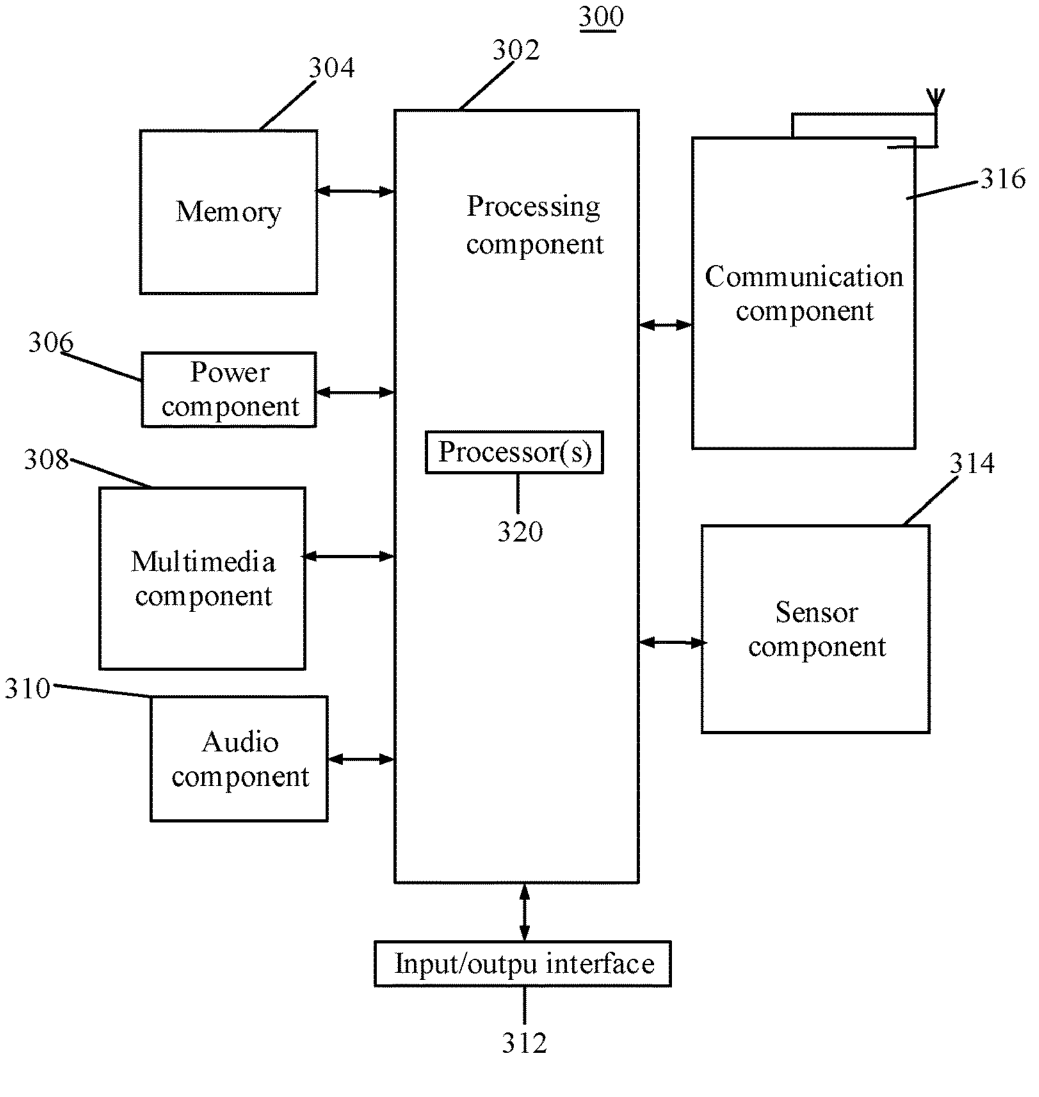
FIG. 11 illustrates a block diagram of a device for changing a communication state according to some embodiments of the present disclosure.

FIG. 11 is a block diagram showing a device 300 for changing a communication state according to an illustrative embodiment of the present disclosure. For example, the device 300 may be a mobile phone, a computer, a digital broadcast terminal, a messaging apparatus, a gaming console, a tablet device, a medical apparatus, exercise device, a personal digital assistant, etc.

Referring to FIG. 11, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls overall operations of the device 300, such as the operations associated with display, telephone calls, data communications, camera operations, and recording operations. The processing component 302 may include one or more processors 320 to execute instructions to complete all or part of the steps in the methods described above. Moreover, the processing component 302 may include one or more modules which facilitate interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented by any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power supply management system, one or more power supplies, and any other components associated with generation, management, and distribution of power for the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a time duration and pressure associated with the touch or swipe action. In some embodiments, the multimedia component 308 includes a front camera and/or a rear camera. The front camera and the rear camera may receive external multimedia data while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed state of the device 300, relative positioning of a components, such as a display and a keypad, of the device 300, a change in position of the device 300 or a component of the device 300, presence or absence of user contact with the device 300, an orientation or an acceleration/deceleration of the device 300, and a change in temperature of the device 300. The sensor component 314 may include a proximity sensor configured to detect the presence of a nearby object without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 may access a wireless network based on a communication standard, such as WiFi, 2G, or 3G, or a combination thereof. In an illustrative embodiment, the communication component 316 receives a broadcast signal or broadcast associated information from an external broadcast management system via a broadcast channel. In an illustrative embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 300 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In an illustrative embodiment, there is also provided a non-transitory computer readable storage medium including instructions, such as the memory 304 including instructions, the above instructions may be executed by the processor 420 in the device 300 for performing the above-described methods. For example, the non-transitory computer-readable storage medium may be a ROM, a Random Access Memory (RAM), a CD-ROM, a magnetic tape, a floppy disc, an optical data storage device, and the like.

FIG. 12 is a block diagram showing a device 400 for changing a communication state according to an illustrative embodiment of the present disclosure. For example, the device 400 may be provided as a network device, such as a base station. Referring to FIG. 12, the device 400 includes a processing component 422, which further includes one or more processors and a memory resource represented by a memory 432 for storing instructions executable by the processing component 422, such as an application program. The application program stored in the memory 432 may include one or more modules, each corresponding to a set of instructions. In addition, the processing component 422 is configured to execute the instructions to execute the aforementioned method.

The device 400 may also include a power supply component 426 configured to perform power supply management of the device 400, a wired or wireless network interface 450 configured to connect the device 400 to the network, and an input/output (I/O) interface 458. The device 400 may operate an operating system stored in the memory 432, such as Windows Server™, Mac OS X™, Unix™, Linux™, FreeBSD™, or the like.

In an illustrative embodiment, there is also provided a non-transitory computer readable storage medium including instructions, such as the memory 432 including instructions, the instructions may be executed by the processing component 422 in the device 400 for performing the above methods. For example, the non-transitory computer-readable storage medium may be a ROM, a Random Access Memory (RAM), a CD-ROM, a magnetic tape, a floppy disc, an optical data storage device, and the like.

The technical solution provided by embodiments of the present disclosure may include the following beneficial effects. In the embodiments of the present disclosure, the terminal equipped with the plurality of SIM cards acquires the first information, and the first information includes the configuration information for the automatic change of the communication state during the communication between the terminal and the network to which the first SIM card belongs. Therefore, the terminal equipped with the plurality of SIM cards can automatically change the communication state based on the configuration information during the process of communication with the network to which the first SIM card belongs, so that the terminal equipped with the plurality of SIM cards can communicate with the network to which the second SIM card belongs in a timely manner, which improves communication performance.

It should be further understood that the term "a plurality of" or "multiple" in the present disclosure refers to two or more than two, and other quantifiers are similar. The term "and/or" describes an association relationship between associated objects, and represents that there may exist three relationships. For example, A and/or B may represent three conditions in which A exists alone, A and B both exist, and B exists alone. The character "/" generally represents that the associated objects before and after this character are in an "or" relationship. The singular forms "a", "the" and "said" are intended to include the plural forms as well, unless the context clearly indicates otherwise.

It should be further understood that, although the terms first, second, etc. may be used to describe various information, such information should not be limited to these terms. These terms are only used to distinguish the same type of information from each other, and do not imply a specific order or importance. In fact, expressions such as "first" and "second" can be used interchangeably For example, without departing from the scope of the present disclosure, the first information may also be referred to as the second information, and similarly, the second information may also be referred to as the first information.

It can be further understood that although the operations in embodiments of the present disclosure are described in a specific order in the drawings, they should not be understood as requiring that the operations should be performed in the specific order shown or in a serial order, or that all the operations shown are to performed to obtain the desired result. In certain environments, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for changing a communication state, comprising:

acquiring, by a terminal equipped with a plurality of Subscriber Identification Module (SIM) cards, first information sent by a first network device, wherein the plurality of SIM cards comprise at least a first SIM card;

wherein the first information comprises configuration information for automatic change of the communication state during communication between the terminal and a first network to which the first SIM card belongs, and the first network device is a network device in the first network to which the first SIM card belongs; and wherein the method further comprises:

acquiring second information sent by the first network device, wherein the second information is configured to indicate whether the terminal is allowed to perform the automatic change of the communication state during the communication with the first network to which the first SIM card belongs; and receiving third information in response to the second information indicating that the terminal is allowed to perform the automatic change of the communication state during the communication with the first network to which the first SIM card belongs, wherein the third information is configured to indicate to perform the automatic change of the communication state, and the third information is adapted for configuration information for a current service state of the terminal.

2. The method for changing the communication state according to claim 1, wherein the first information comprises configuration information for the first SIM card to change from a connected state to an idle state.

3. The method for changing the communication state according to claim 2, wherein the first information comprises information on a time duration required for the first SIM card to change from the connected state to the idle state.

4. The method for changing the communication state according to claim 3, wherein the information on the time duration comprises information of a timer duration after a leave request signaling is sent by the first SIM card to the first network to which the first SIM card belongs, and the leave request signaling is configured to request the terminal to leave the first network to which the first SIM card belongs.

5. The method for changing the communication state according to claim 3, wherein the first information further comprises:

correspondence between the information on the time duration and a terminal service scenario.

6. The method for changing the communication state according to claim 1, wherein the first information comprises configuration information for the first SIM card to change from a connected state to an inactive state; and wherein the first information further comprises at least one of following information:

inactive radio network temporary identifier configuration information;

radio access network-based notification area configuration information; and paging cycle configuration information.

7. The method for changing the communication state according to claim 1, wherein the acquiring the first information sent by the first network device comprises:

acquiring the first information sent by the first network device based on first radio resource control information.

8. The method for changing the communication state according to claim 7, wherein the first information is carried in OtherConfig signaling in the first radio resource control information; and wherein in response to determining that the network to which the first SIM card belongs is an evolved Universal Mobile Telecommunications System (UMTS) terrestrial radio access network, the first information is carried in OtherConfig signaling of RRCConnectionReconfiguration; or in response to determining that the network to which the first SIM card belongs is a new radio network, the first information is carried in OtherConfig signaling of RRCReconfiguration.

9. The method for changing the communication state according to claim 1, wherein the method for changing the communication state further comprises:

sending capability information to the first network device, wherein the capability information is configured to indicate that the terminal has capability of automatically changing the communication state during the communication with the network to which the first SIM card belongs; and wherein the capability information is further configured to indicate that the terminal has capability of automatically changing to at least one of an idle state and an inactive state during the communication with the network to which the first SIM card belongs.

10. The method for changing the communication state according to claim 9, wherein the sending the capability information to the first network device comprises:

sending the capability information to the first network device based on second radio resource control information.

11. The method for changing the communication state according to claim 1, wherein the method further comprises:

automatically changing the communication state based on the configuration information for the automatic change of the communication state during the communication with the first network to which the first SIM card belongs, and performing communication with a second network to which a second SIM card belongs.

12. A method for changing a communication state, comprising:

sending, by a network device in a network to which a first Subscriber Identification Module (SIM) card belongs, first information, wherein the first information comprises configuration information for automatic change of the communication state during communication between a terminal and the network to which the first SIM card belongs; and wherein the method further comprises:

sending second information, wherein the second information is configured to indicate whether the terminal is allowed to perform the automatic change of the communication state during the communication with the network to which the first SIM card belongs; and sending third information in response to the second information indicating that the terminal is allowed to perform the automatic change of the communication state during the communication with the network to which the first SIM card belongs, wherein the third information is configured to indicate to perform the automatic change of the communication state, and the third information is adapted for configuration information for a current service state of the terminal.

13. The method for changing the communication state according to claim 12, wherein the first information comprises configuration information for the first SIM card to change from a connected state to an idle state.

14. The method for changing the communication state according to claim 13, wherein the first information comprises information on a time duration required for the first SIM card to change from the connected state to the idle state; and wherein the information on the time duration comprises information of a timer duration after a leave request signaling is sent by the first SIM card to the network to which the first SIM card belongs.

15. The method for changing the communication state according to claim 14, wherein the first information further comprises:

correspondence between the information on the time duration and a terminal service scenario.

16. The method for changing the communication state according to claim 12, wherein the first information comprises configuration information for the first SIM card to change from a connected state to an inactive state; and wherein the first information comprises at least one of following information:

inactive radio network temporary identifier configuration information;

radio access network-based notification area configuration information; and paging cycle configuration information.

17. The method for changing the communication state according to claim 12, wherein the sending the first information comprises:

sending the first information based on first radio resource control information.

18. The method for changing the communication state according to claim 17, wherein the first information is carried in OtherConfig signaling in the first radio resource control information; and wherein in response to determining that the network to which the first SIM card belongs is an evolved UMTS terrestrial radio access network, the first information is carried in OtherConfig signaling of RRCConnectionReconfiguration; or in response to determining that the network to which the first SIM card belongs is a new radio network, the first information is carried in OtherConfig signaling of RRCReconfiguration.

19. The method for changing the communication state according to claim 12, wherein the method for changing the communication state further comprises:

receiving capability information sent by the terminal, wherein the capability information is configured to indicate that the terminal has capability of automatically changing the communication state during the communication with the first network to which the first SIM card belongs;

wherein the capability information is configured to indicate that the terminal has capability of automatically changing to at least one of an idle state and an inactive state during the communication with the network to which the first SIM card belongs; and wherein the receiving the capability information sent by the terminal comprises:

receiving the capability information sent by the terminal based on second radio resource control information.

20. A terminal for changing a communication state, comprising:

a plurality of Subscriber Identification Module (SIM) cards, wherein the plurality of SIM cards comprise at least a first SIM card, a processor; and a memory configured to store instructions executable by the processor;

wherein the processor is configured to:

acquire information sent by a first network device, wherein the information comprises configuration information for automatic change of a communication state during communication between the terminal and a network to which the first SIM card belongs, and the first network device is a network device in the network to which the first SIM card belongs; and wherein the processor is further configured to:

acquire second information sent by the first network device, wherein the second information is configured to indicate whether the terminal is allowed to perform the automatic change of the communication state during the communication with the first network to which the first SIM card belongs; and receive third information in response to the second information indicating that the terminal is allowed to perform the automatic change of the communication state during the communication with the first network to which the first SIM card belongs, wherein the third information is configured to indicate to perform the automatic change of the communication state, and the third information is adapted for configuration information for a current service state of the terminal.

* * * * *